US009527679B2

(12) United States Patent
Neiser et al.

(10) Patent No.: US 9,527,679 B2
(45) Date of Patent: Dec. 27, 2016

(54) GAPPING SYSTEMS AND METHODS

(71) Applicant: INTELLIGRATED HEADQUARTERS LLC, Mason, OH (US)

(72) Inventors: Raymond R. Neiser, Batavia, OH (US); Brian J. Resnick, West Chester, OH (US); Ralf Buerkle, Oregonia, OH (US)

( * ) Notice: Subject to any disclaimer, the term of this patent is extended or adjusted under 35 U.S.C. 154(b) by 0 days.

(21) Appl. No.: 14/719,588

(22) Filed: May 22, 2015

(65) Prior Publication Data
US 2015/0336748 A1  Nov. 26, 2015

Related U.S. Application Data

(60) Provisional application No. 62/002,708, filed on May 23, 2014.

(51) Int. Cl.
| B65G 47/26 | (2006.01) |
| B65G 43/08 | (2006.01) |
| B65G 37/00 | (2006.01) |
| B65G 47/30 | (2006.01) |
| B65G 47/31 | (2006.01) |
| B65G 43/10 | (2006.01) |

(52) U.S. Cl.
CPC .............. *B65G 47/26* (2013.01); *B65G 37/00* (2013.01); *B65G 43/08* (2013.01); *B65G 43/10* (2013.01); *B65G 47/30* (2013.01); *B65G 47/31* (2013.01)

(58) Field of Classification Search
CPC ......... B65G 47/28; B65G 47/31; B65G 43/08; B65G 47/26
See application file for complete search history.

(56) References Cited

U.S. PATENT DOCUMENTS

| 4,681,523 | A |   | 7/1987  | Thelen |            |
| 4,934,510 | A |   | 6/1990  | Lutgendorf |        |
| 5,267,638 | A | * | 12/1993 | Doane   | B65G 43/08 |
|           |   |   |         |         | 198/357    |
| 6,629,593 | B2 | * | 10/2003 | Zeitler | B65G 43/08 |
|           |   |   |         |         | 198/460.1  |
| 6,648,125 | B1 |   | 11/2003 | Bershadsky |         |
| 7,264,109 | B2 | * | 9/2007  | Raque   | B65G 43/10 |
|           |   |   |         |         | 198/460.1  |
| 7,854,314 | B2 |   | 12/2010 | Pelak et al. |       |
| 8,042,677 | B2 | * | 10/2011 | Konig   | B65G 43/10 |
|           |   |   |         |         | 198/460.1  |

(Continued)

FOREIGN PATENT DOCUMENTS

EP          0812789 A2     12/1997

OTHER PUBLICATIONS

International Search Report and the Written Opinion of the International Searching Authority in International Application No. PCT/US2015/032096 dated Aug. 24, 2015.

*Primary Examiner* — Thomas Randazzo

(57) ABSTRACT

Various embodiments provide systems and methods for providing a desired gap between articles within a continuously flowing train of articles. Various embodiment methods may include operating a material handling system including a plurality of conveying units, by generating motion profiles for a plurality of articles to provide a pre-determined gap between the articles, and controlling the plurality of conveying units to move each article in accordance with its motion profile as the plurality of articles move through the material handling system.

14 Claims, 14 Drawing Sheets

(56) References Cited

U.S. PATENT DOCUMENTS

| | | | |
|---|---|---|---|
| 8,079,462 B2 | 12/2011 | Pelak et al. | |
| 8,201,681 B2 * | 6/2012 | Schiesser | B65G 43/08 198/460.1 |
| 8,800,750 B2 * | 8/2014 | Buchberger | B65G 47/31 198/461.1 |
| 9,067,741 B2 * | 6/2015 | Acerbis | B65G 47/084 |
| 9,150,362 B2 * | 10/2015 | Vegh | B65G 43/08 |
| 2008/0023302 A1 * | 1/2008 | Groom | B65G 47/268 198/781.06 |
| 2008/0082206 A1 * | 4/2008 | Egami | B65G 47/31 700/230 |
| 2009/0171501 A1 * | 7/2009 | Hills | B64F 1/368 700/230 |
| 2010/0200365 A1 | 8/2010 | Pressler et al. | |

\* cited by examiner

GAPPING SYSTEMS AND METHODS

RELATED APPLICATION

This application claims the benefit of priority to U.S. Provisional Patent Application No. 62/002,708, filed on May 23, 2014, the entire contents of which are hereby incorporated by reference in their entirety.

BACKGROUND

The present disclosure relates generally to material handling systems, and is more particularly directed to gapping methods and systems that provide a desired gap between articles (e.g., cartons) within a continuously flowing train of articles.

Establishing a correct gap between cartons within a continuously flowing train of cartons has become an increasingly difficult problem to solve over the last several decades. At low speeds, there is no real challenge. For example, if two cartons, traveling at 100 feet per minute (FPM) have only 1 inch of gap between them, but require 12 inches, the control system can easily create the required gap, because (at 0.5 g) the second carton can be stopped within an inch of travel after the previous carton has exited the conveyor. However, as the speed of the cartons increases, the conveyor takes longer to stop (at the same deceleration rate). Also, the carton is traveling at a higher average speed during that extended time. Hence, the distance required to stop a carton increases with the square of the increase in speed.

As a result, at 600 FPM, the travel distance which the second carton requires in order to increase the gap between itself and the previous carton (constantly moving at 600 FPM) by 11 inches is 46 inches. Obviously, there is not nearly enough space available to effect this change after the first carton exits the controlling conveyor.

Conventional single-stage gapping units must either give up or release at a speed which will usually cause the required gap to be "pulled" between the cartons. This method, while it can be reasonably effective with exotic algorithms applied, is based on assumed weight transfer points for cartons and inadvertently effects gapping of neighboring cartons. The result, unavoidably, is a level of ineffectiveness that worsens at higher speeds.

SUMMARY

The various embodiments provide systems and methods for providing a desired gap between articles within a continuously flowing train of articles. Various embodiment methods may include operating a material handling system including a plurality of conveying units, by generating motion profiles for a plurality of articles to provide a pre-determined gap between the articles, and controlling the plurality of conveying units to move each article in accordance with its motion profile as the plurality of articles move through the material handling system.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
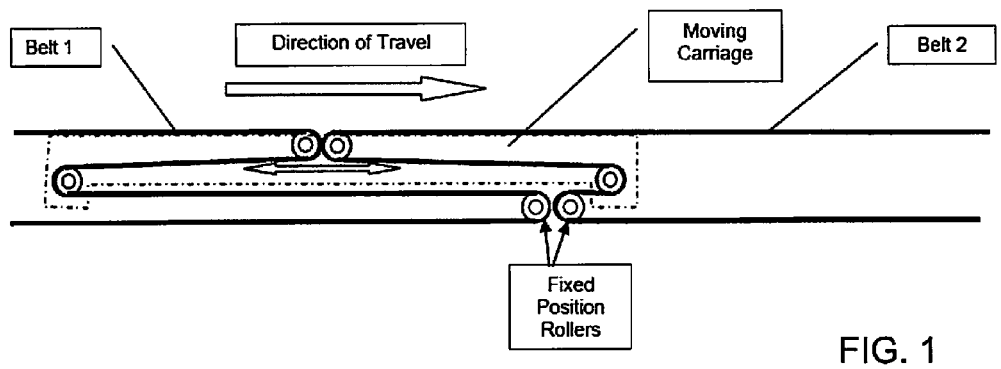
FIGS. 1-3 schematically illustrate an embodiment of a material handling system having a carriage that physically moves the transition(s) between upstream and downstream conveying belts.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "computing device" is used herein to refer to any one or all of desktop computers, personal data assistants (PDA's), laptop computers, tablet computers, smart books, palm-top computers, personal computers, and similar electronic devices equipped with at least a processor configured to perform the various operations described herein.

The various embodiments are described herein using the term "server." The term "server" is used to refer to any computing device capable of functioning as a server, such as a master exchange server, web server, mail server, document server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The various embodiments provide systems and methods for providing a desired gap between articles within a continuously flowing train of articles. The various embodiments may be implemented in a material handling system which may move a plurality of articles, such as cartons, using one or more conveying mechanisms (e.g., conveyor belts). The embodiments may also be used for an induct conveyer in a loop sorter where the gapping may be used to time the induct to match a particular tray or cross belt going by the induct. Additionally, the various embodiments may enable articles fed to a sorter, such as a sliding-shoe sorter, to be aligned with slats of the sorter.

Sequential, Independent, Multi-Transition Gapping

A first technique for providing a desired gap between articles (e.g., cartons) within a continuously flowing train of articles includes utilizing multiple (2 to n) belts (e.g., conveyer belts) with multiple conveyer transitions at which the gaps between articles may be adjusted. This concept relies on a sufficient number of controlled transitions to effect the total gap adjustment required.

In the case where the gap needs to be increased, since the gap is increased at each transition, the next downstream transition has more distance (space) to further effect an increase. Each transition, therefore, can be increasingly effective. Conversely, in the case where the gap needs to be decreased, the available space, in which to effect a change, progressively decreases.

One may mathematically arrive at the optimum number of belts required and implement a solution that would result in perfect gap (within a small tolerance) between any two given articles (e.g., with a maximum starting gap of ~24 inches). However, this does not account for the impact those adjustments would have on other articles upstream and downstream of the pair.

The most common control schemes make adjustments at the individual transitions with little or no regard for the resultant side effects on other articles (although they do account for downstream conveyor ongoing speed variations occurring for downstream adjustments).

More sophisticated control schemes may schedule or vary the adjustments to minimize the negative side effects on article gaps at neighboring transitions. Such an arrangement has two primary limitations. Specifically, adjustments can inadvertently have adverse effects on article gaps at neighboring conveyor transitions. Also, there may be a problem of compounding acceleration/deceleration rates. For example, if belt "A" needs to slow down at the max deceleration rate in order to open a gap between the last released article (currently on belt "B") and the next to release article, but the downstream belt "B" is also in a max deceleration mode in order to further open a downstream gap relative to an article on belt "C", belt "A" cannot slow down relative to belt "B" and is therefore ineffective in adjusting the gap.

The various embodiments described herein may address one or more of these problems associated with the control schemes described above.

Single Transition with Mechanically Variable Transition Position

Figure 2:
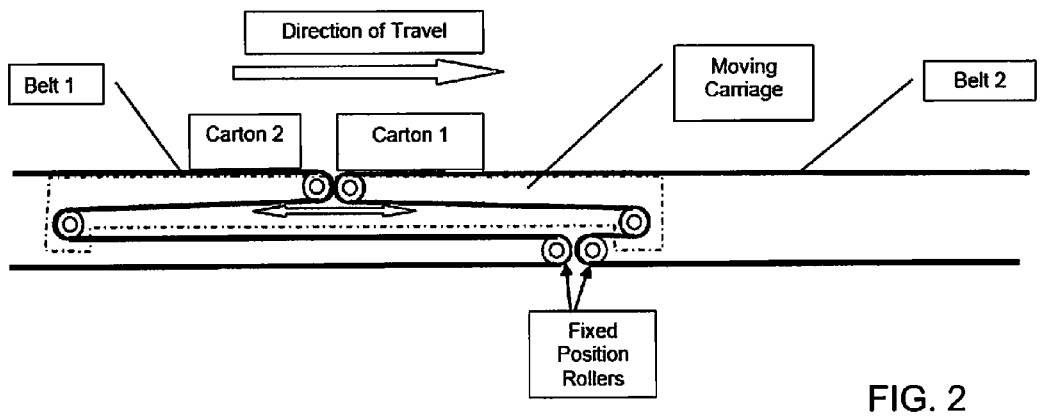
Figure 3:
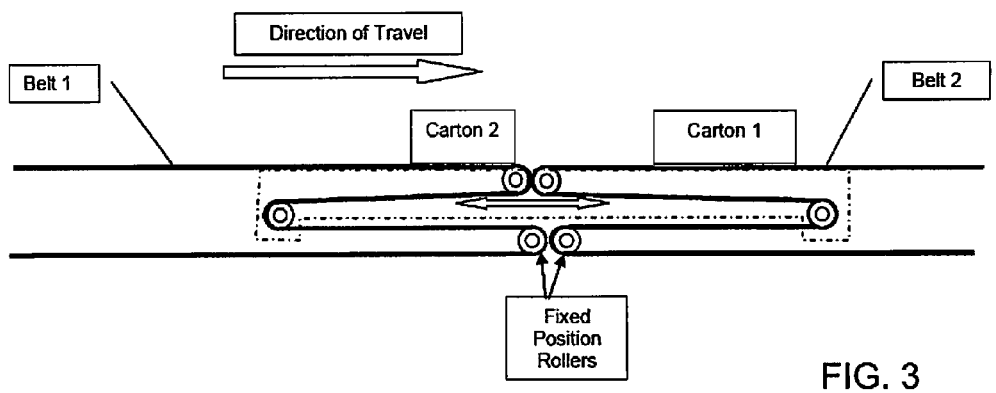

FIGS. 1-3 illustrate an embodiment of a material handling system having a carriage which is configured to physically move the transition(s) between upstream and downstream belts. As shown in FIG. 1, the carriage may be controlled by a system controller to move (parallel to the direction of belt travel) the transition between the upstream and downstream belts. A common single transition gapping conveyor is commonly not effective at high speeds because there is not enough travel distance available to the second article after the first article passes the transition. The second article requires enough distance in order to effect a gently controlled speed change sufficient to make the required gap adjustment.

In the embodiment system shown in FIGS. 1-3, after carton 1 passes the transition (see FIG. 2), the carriage may physically move the transition in the same direction as carton travel. The transition may remain just ahead of carton 2, long enough to give carton 2 the travel distance it needs for belt 1 to slow down enough to effect the required gap adjustment (see FIG. 3). Once the gap adjustment has been made and the speed of belt 1 again matches the speed of belt 2, the transition may quickly move back to its original position or to the front edge of the next carton, whichever is nearer. The same concept, with belt 1 speeding up to a speed faster than belt 2, may also be used for reducing large gaps.

The system of FIGS. 1-3 may be effectively utilized to provide a desired gap between articles (e.g., cartons) within a continuously flowing train of articles. In some cases, repeated movements of the transition may result in a "creep" movement of the transition in the downstream direction. For example, at 600 FPM, with consecutive 9 inch cartons having only 1 inch gaps, and a need to open these gaps to 11 inch, the required transition movement may result in approx. 34 in. "creep" (in the downstream direction) per gap adjustment. Hence, the system of FIGS. 1-3 may be most effective in cases in which there are a limited number of such carton gaps consecutively (e.g., where the system only has to deal with 4 or 5 such carton gaps consecutively, which may result in ~12-15 foot transition range of motion).

Single Transition with Concurrent Independent Article Motion Profiles

Further embodiments may utilize a series of consecutive, separately powered and/or separately controllable conveying units. The conveying units may be, for example, individually powered rollers (or groups of rollers), short belt conveyors, short strip belt conveyors, or some combination thereof. Other possible conveying units may also be utilized. The conveying units may be arranged such that each independently powered section will affect the motion of only one article at a time. This allows a motion profile (e.g., a velocity profile, acceleration profile, etc.) to be executed for a given article without affecting the motion profile for any other article.

If a given unit affected the motion of more than one article at a time, the motion profile for one article necessarily impacts a neighboring article. This generally prevents using the most effective profile for either article.

Various embodiments may enable the use of independent, truly concurrent motion profiles (e.g., velocity profiles, acceleration profiles, etc.). The logic, when planning a given article's motion profile, must still take the neighboring articles into account. However, that is consistent with a primary purpose of such a unit: to readjust, as necessary, a given article's position relative to neighboring articles.

A difference in the various embodiments is that the execution of article motion profiles (e.g., velocity profiles, acceleration profiles, etc.), relative to the discharge point of the unit, may be concurrent. In most conventional systems, the execution of article motion profiles, relative to the discharge point of the unit, is sequential.

Various embodiments may implement gap control by generating pre-planned article (e.g., carton) motion profiles (e.g., velocity profiles, acceleration profiles, etc.) and causing the power units which exert influence on the article's motion to inherit the article's motion profile. As articles traverse a given unit, the unit runs at a speed and acceleration rate consistent with the article's motion profile. As that article exits the unit, the unit may abandon that article's profile and inherit the profile of the next arriving article. Should a situation occur in which the unit is exerting influence over two articles simultaneously, in the various embodiments the unit may inherit the profile for the article which it more completely controls.

The length and quantity of the individual units may vary according to the requirements of the system. In determining the length of the individual units, the following factors may be considered:

Minimum article length being handled.

Minimum starting gap to be expanded.

Whether the length of the units should be uniform or variable across the system. For example, the lengths of the units may be variable with the length of the units getting longer as the article gaps expand. However, because motion profiles may need to start at any point in the gapping system, the length of the units may be as short as possible.

The number of consecutive, difficult gap adjustments the gapping system is required to execute.

Figure 4:
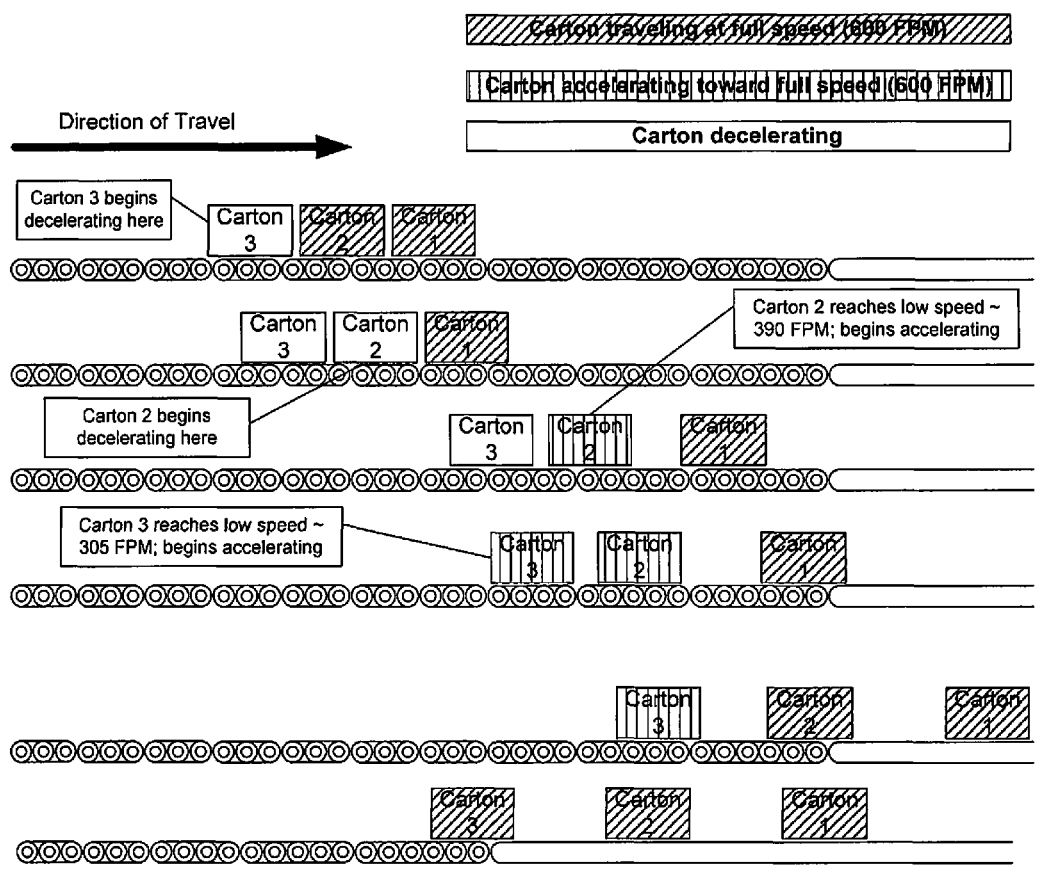
FIG. 4 is a series of illustrations showing the operation of an embodiment of a gapping system that includes a series of consecutive, separately controllable conveying units according to an embodiment.

FIG. 4 is a series of illustrations which show the operation of an embodiment of the gapping system. In the illustrations, it is assumed that the system will be fed by a brake/metering conveyor, which may be used to detect and measure the arriving cartons and provide a minimal starting gap. The embodiment in FIG. 4 assumes 9 inch cartons, 1 inch starting gaps, 11 inch final gaps, base conveyor speed of 600 FPM (although higher speeds up to and exceeding 650 FPM are contemplated), 0.45 g linear acceleration/deceleration rate, and that carton 1 is preceded by the correct gap, requiring no adjustments for carton 1.

Figure 5:
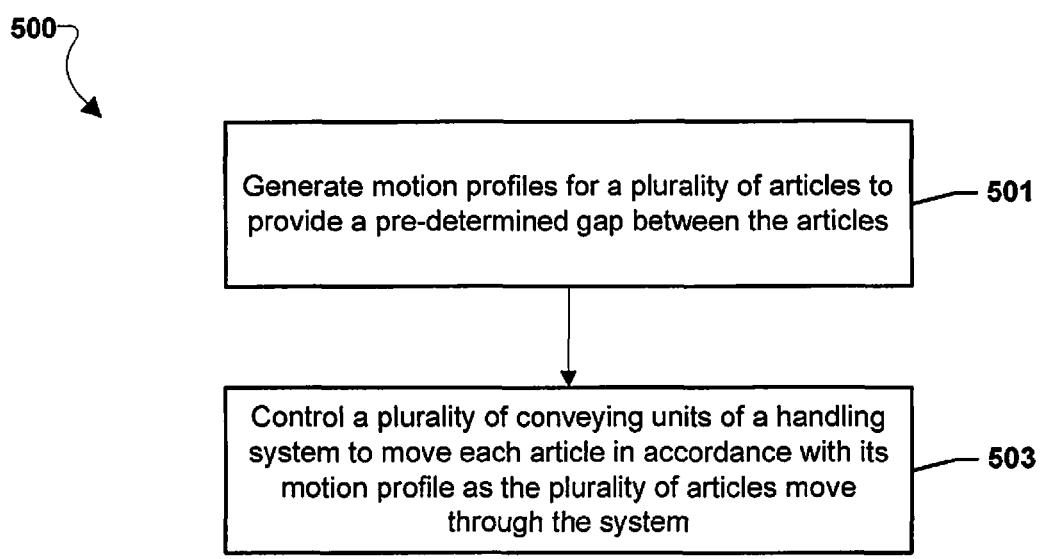
FIG. 5 is a process flow diagram illustrating an embodiment method of operating a material handling system to provide gap control.
Figure 7:
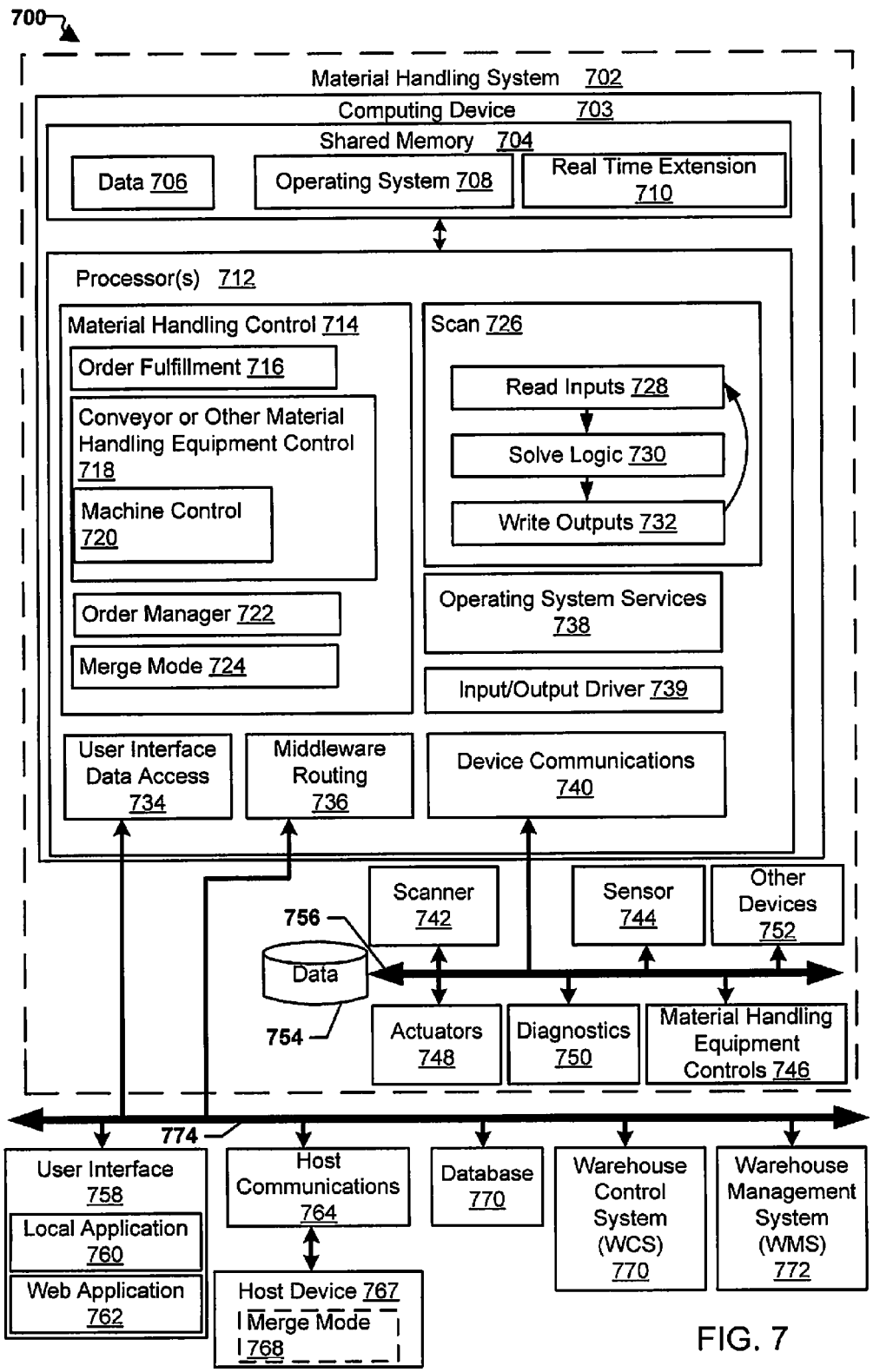
FIG. 7 illustrates an exemplary processing architecture of a material handling system suitable for use with the various embodiments.

FIG. 5 is a process flow diagram that illustrates an embodiment method 500 for operating a material handling system including a plurality conveying units. The method 500 may be implemented in a system such as shown in FIG. 4 which may be controlled by a system controller having a processing architecture as shown in FIG. 7. In block 501, motion profiles for a plurality of articles may be generated to provide a pre-determined gap between the articles. The articles may be cartons, for example, which may enter the system having a first spacing (gap) between each article. The first gaps may be known and/or determined (e.g., detected) by the system. The motion profiles may be generated so as to provide a pre-determined second spacing (gap) between each article when the articles exit the system.

In block 503, a plurality of conveying units of the handling system may be controlled to move each article in accordance with its motion profile as the plurality of articles move through the system. The conveying units may include, for example, a series of rollers (or groups of rollers), short belt conveyors, short strip belt conveyors, or another conveying mechanism that may be controlled independently of the other conveying units in the system. The conveying unit may be controlled so that each article that is moved by the conveying unit is moved in accordance with the generated motion profile for that article. In embodiments, the conveying unit may be controlled so as to move the article with a velocity and/or an acceleration that is based on the motion profile for that article. After the article is moved off of the unit (i.e., is transitioned to a subsequent conveying unit), the conveying unit may be controlled so as to move the next article in the flow of articles with a velocity and/or an acceleration that is based on the motion profile for that next article. Thus, the series of conveying units may be controlled to concurrently implement the plurality of motion profiles for each of the articles. Upon exiting the series of conveying units, the plurality of articles may have the pre-determined gap between the articles.

Various embodiments may include a gapping system and method that can handle a stream of articles (e.g., cartons) at high velocity (e.g., >500 feet per minute, such as 600 feet per minute or more, such as 600-800 feet per minute). The system may include a brake/meter belt at the entrance to separate touching articles (e.g., cartons). The system may include a relatively large distance between an article detector (e.g., visual, photo eye) and a first transition point (e.g., end of a first belt) to collect enough article and gap information to enable appropriate planning, which article to move forward, which to move back, which to leave as is, etc.

An alternative to the use of multiple conveying unit controls is to treat each as a separate system that delivers with no speed difference, possibly as a fixed speed separating conveying unit. This has limits on how much can be accomplished per conveying unit, and results in numerous separate systems.

Figure 6D:
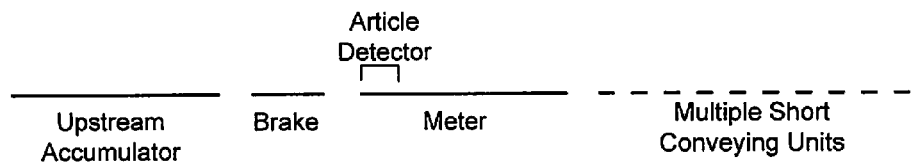
FIGS. 6A-6N illustrate exemplary implementations of a gapping method and system.
Figure 6D:
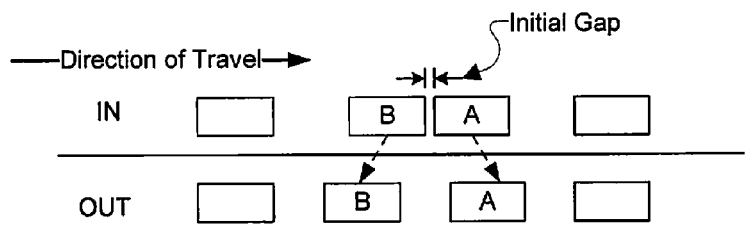
Figure 6D:
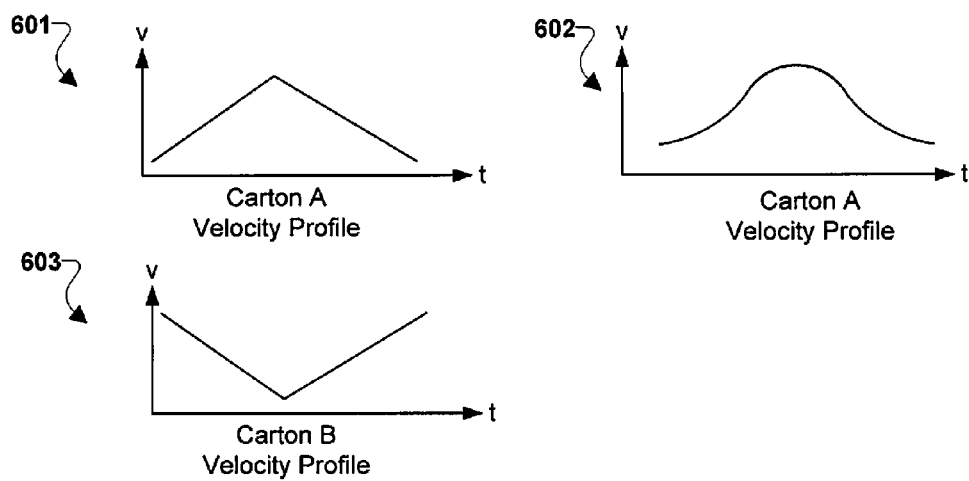
Figure 6D:
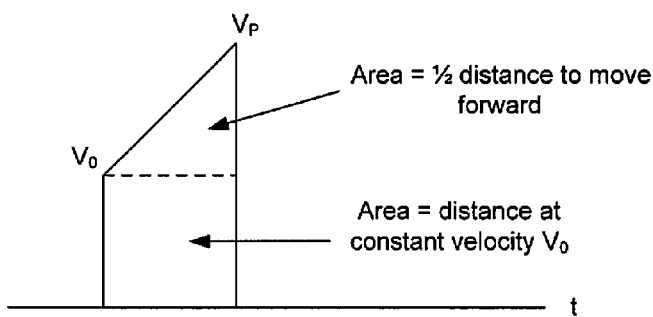

Another alternative is to have relatively short conveying units, including conveying units that do not affect more than one article. With this situation, each article may receive independent control across all of the conveying units. A single profile for each article may be generated across multiple conveying units, rather than separate profiles for each transition. The result is schematically illustrated in FIG. 6A.

In this embodiment, the brake/metering section need not be variable speed, and may comprise, for example, more short stages. The length of the short conveying units may be short enough so that they typically affect only one article at a time. In some embodiments, the length of each conveying unit may be no longer than the length of the shortest article to be moved through the system. In embodiments, the conveying units may be shorter than length of the shortest article to allow for acceleration/deceleration between articles.

On the premise that the meter belt is fixed speed, for example, consider two cartons too close together in between two other cartons, and the correction is to move the leading carton A forward and the trailing carton B backwards. This is illustrated in FIG. 6B. Presume no action is taken on the carton until it is completely on the short conveying units (e.g., short belts). The motion profile, in this case a velocity profile, for carton A may be a ramp up followed by a ramp down. In various embodiments, the velocity profiles may be a linear velocity profiles, non-linear velocity profiles, or combinations of linear and non-linear velocities, and may describe the planned velocity of the article over time. Example velocity profiles 601 and 602 for carton A are shown in FIG. 6C. While velocity profiles are illustrated in FIG. 6C, acceleration profiles may be used instead of, or in addition to, velocity profiles to control the conveying units. Acceleration profiles may describe acceleration and/or deceleration of an article over time, and may be linear, non-linear, constant, or combinations of linear, non-linear, and/or constant accelerations/decelerations over time.

Carton A's profile may begin as soon as A enters the multi-conveying unit portion of the system, such as when A is no longer under control of the meter belts and enters the multi-conveying unit portion of the system. The velocity may ramp up from an initial velocity ($V_O$) to a peak velocity ($V_P$) over a period of time (t) that produces one-half of the distance (d) that carton A must move forward assuming a constant acceleration rate (a). Once the velocity reaches the peak velocity ($V_P$) then the velocity may ramp back down. The increase to reach the peak velocity ($V_P$) from the initial velocity ($V_O$) (e.g., the velocity of meter belt feeding the multi-conveying unit portion of the system) is shown graphically in FIG. 6D.

Similarly, carton B's profile may be triangular (or alternatively curved) and may not begin until B is no longer under control of the meter belt and enters the multi-conveying unit portion of the system. Of interest is the velocity and time at each position along the way. The velocity and position of each article may be determined at each position or point. The acceleration rate of the belt between the articles may be calculated by $\Delta V/\Delta t$. As used herein, "between" the articles means what the belt must do after a first article (e.g., carton A) has left in preparation for the next article (e.g., carton B). The velocity profile 603 of carton B is illustrated in FIG. 6C. As illustrated by the initial deceleration of the velocity profile 603 and the initial acceleration of the velocity profile 601, the system is trying to move carton B "backwards" relative to carton A by speeding up carton A and slowing down carton B, thereby increasing the gap between carton A and carton B.

Calculations for velocity and time of an article at each position along the path while the article is accelerating may be made based on the relationships between position (or distance) of the article at a given time (t) (i.e., $P_t$), the acceleration rate (a), the initial velocity ($V_0$), and the velocity at the given time ($V_t$). For example, for any position ($P_t$) during the acceleration, the time (t) may be determined according to the equation:

$$t = \frac{\sqrt{V_0^2 + 2aP_t} - V_0}{a}.$$

Once time (t) is calculated, the velocity at the given time ($V_t$) may be calculated according to the equation:

$$V_t = V_0 + at$$

Similarly, calculations of velocity and time of an article at each position along the path while the article is decelerating may be made based on the relationships between position (or distance) of the article at a given time (t) (i.e., $P_t$), the acceleration rate (a) (i.e., a negative value during deceleration of the article), the initial velocity ($V_0$), and the velocity at the given time ($V_t$). For example, for any position $P_t$ during the deceleration, time (t) may be determined according to the equation.

$$t = \frac{V_0 - \sqrt{V_0^2 + 2aP_t}}{a}$$

Once time (t) is calculated, the velocity at the given time ($V_t$) may be calculated according to the equation:

$$V_t = V_0 - at$$

In one embodiment, a data structure (e.g., an array or table, such as a spreadsheet) may be developed that includes the velocity and time for each point and may include the calculated acceleration required of the conveying units between articles.

In embodiments, when the article leaves the metering belt, which may be fixed speed, the conveying units (e.g., short belts) of the multi-conveying unit portion may be at the same speed.

In embodiments, the gapping system may include at least two software modules, a velocity profile planner and a velocity profile controller. The velocity profile planner may calculate a velocity profile for an article. The velocity profile controller may implement the calculated velocity profile by controlling the various conveying units according to the velocity profile.

Figure 6E:
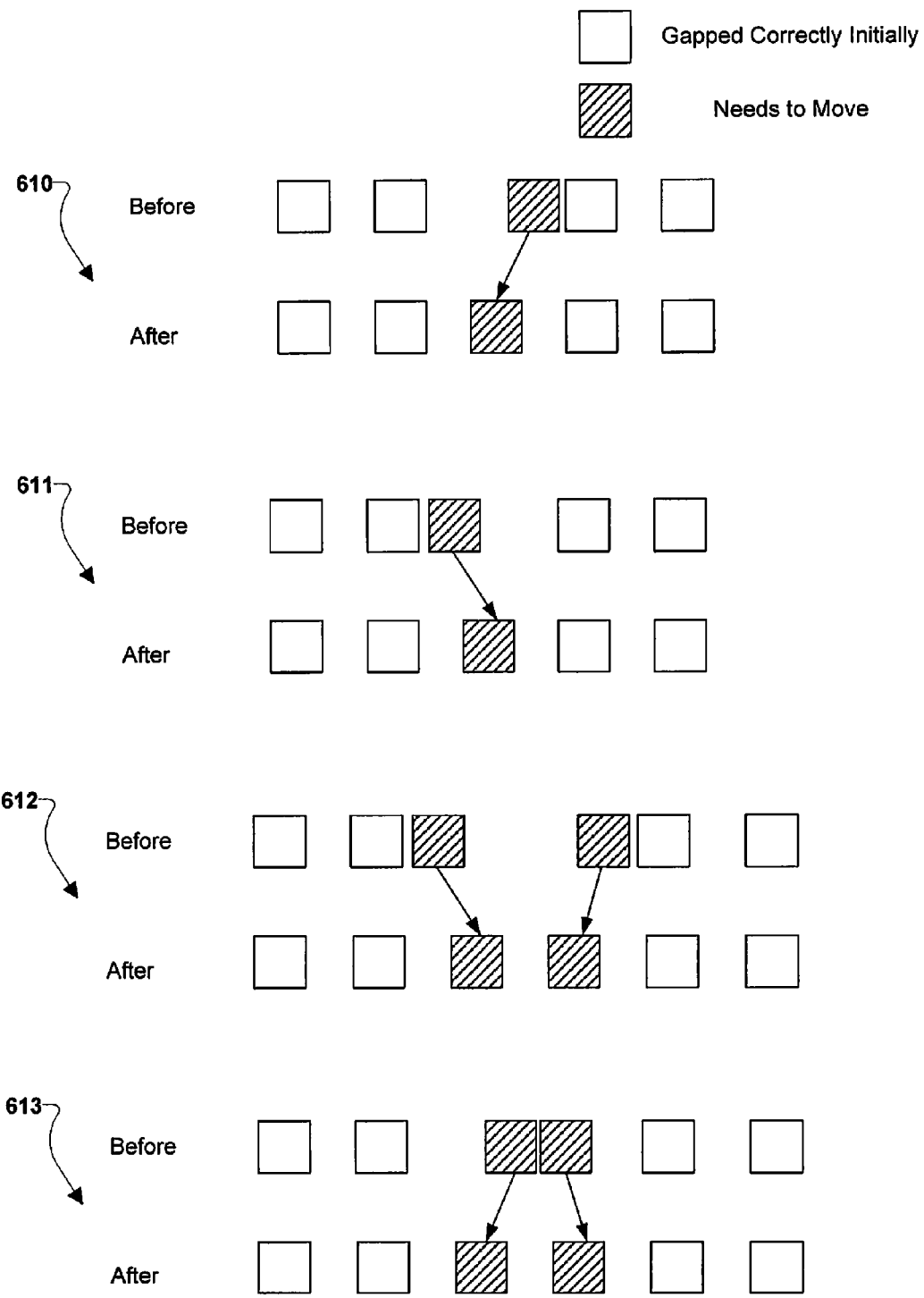

FIG. 6E schematically illustrates a series of cartons 610, 611, 612, and 613 which are flowing into the gapping system ("Before") and the same cartons having the desired gap spacing ("After"). The ideal is to have the white cartons in FIG. 6E pass through the gapping system without speed up or slow down, because their gaps are fine. The shaded cartons need a velocity profile that moves them forward or backward relative to the other cartons.

Figure 6F:
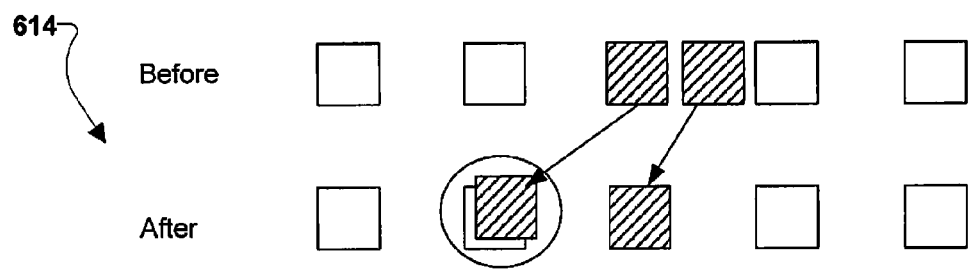
Figure 6F:
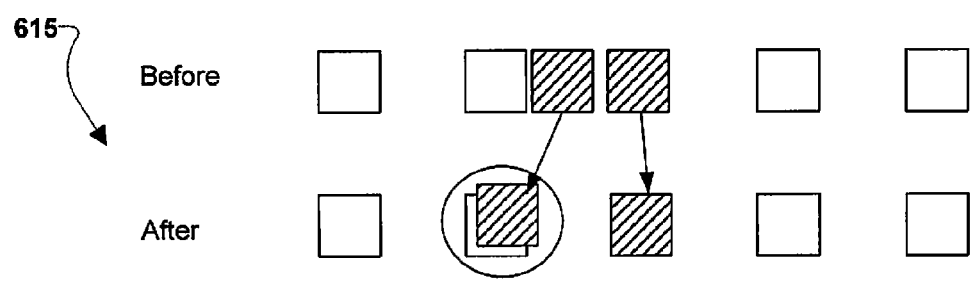

As illustrated in FIG. 6F, though not moving cartons with the desired gap may be ideal, the movement of a carton in series of cartons 614 or 615 may cause the carton to impact another carton, such as a carton that was initially correctly gapped. When such an event occurs, more than the initially incorrectly gapped cartons may be affected and may need to be moved.

Figure 6G:
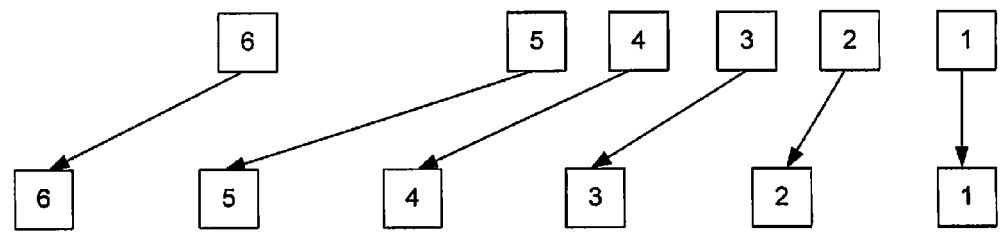

At some point, due to preceding carton positions, etc., there will be a situation as shown in FIG. 6G, where carton 1 passes through unaffected, carton 2 moves backward a little, carton 3 moves backward more than carton 2, carton 4 moves backward even more than carton 3, and carton 5 moves backward more than carton 4. Carton 6 has a proper gap, but must still be affected due to carton 5's profile.

The angle of the arrows in FIG. 6G represents the acceleration upon the carton. For example, carton 5 has a more severe correction than carton 2. There may be a maximum acceleration that the carton and conveying unit (e.g., belt) may handle without causing rocking due to jerk (e.g., about 0.45 g for a triangular velocity profile, which may be increased with a curved velocity profile).

There are at least two ways of implementing the profiles for each article. In one method (METHOD A), the same acceleration (e.g., the max acceleration, or an acceleration close to the max acceleration) is used for all articles. The other method (METHOD B) includes using a portion of the length of the gapping system to fit the profile(s), such as the entire length of the gapping system or a length less than the entire length of the gapping system.

Figure 6H:
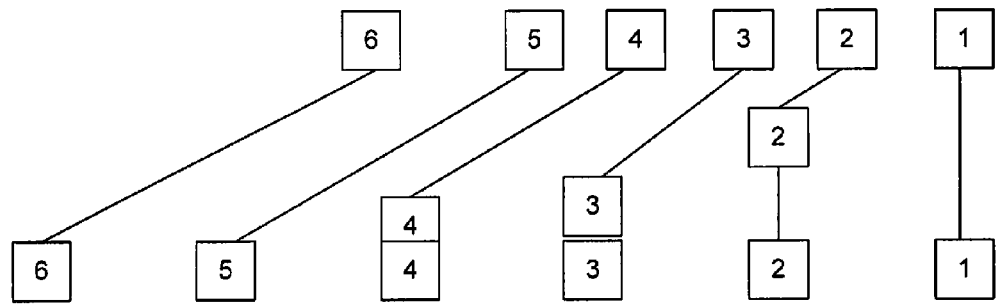

If the first method (METHOD A) is used, then FIG. 6G becomes as shown in FIG. 6H. The planning algorithm must include the knowledge of how much correction the previous carton was attempting, and this must be added to the next carton. For instance, if carton 1 had no correction, carton 2 need only correct (move backward) for the required gap between cartons 1 and 2. Carton 3 needs to correct (move backward) for the required gap between cartons 2 and 3 plus the correction implemented by carton 2.

If using the first method, the profiles may be shorter than the length of the gapping system, and thus the profiles may be started and/or ended at various points along the length of the system. In one embodiment, the profiles for moving articles backward may be started at the entrance to the gapping system and profiles for moving articles forward may end at the exit of the gapping system. In another embodiment, the profiles for moving articles forward may be started at the entrance to the gapping system and profiles for moving articles backward may end at the exit of the gapping system. The reason for this is that this may minimize overlapping of the profiles.

In embodiments, each article has its own profile, and all profiles for the articles on the conveying units may be implemented simultaneously. The nose (leading end) of each article may be tracked, and knowing the length of each article, it may be determined which conveying units (e.g., belts) to control for a given article.

Figure 6I:
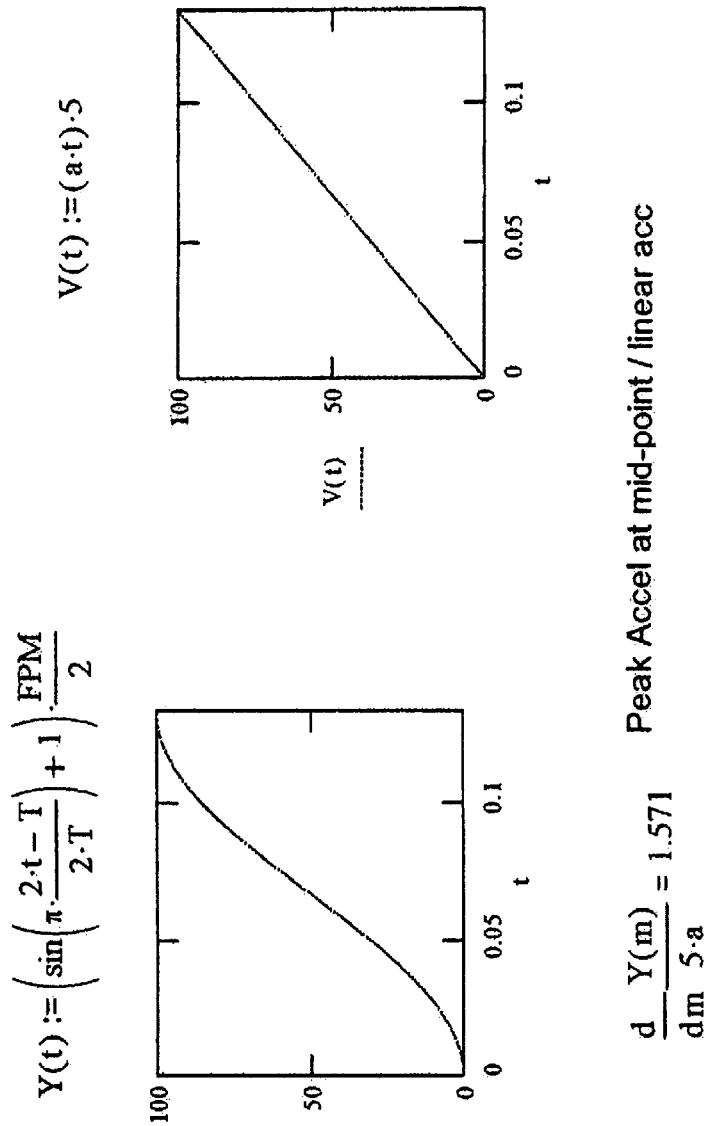
Figure 6J:
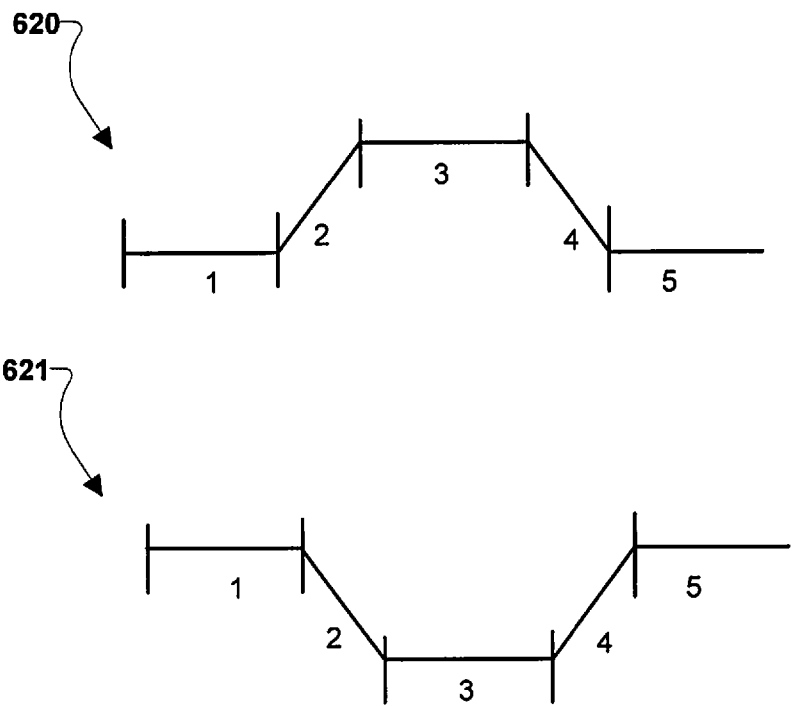
Figure 6K:
Figure 6K:

In one embodiment, a sinusoidal velocity profile may be used, and for a given time (T), the peak acceleration of the sinusoidal velocity profile occurs at T/2 and produces an acceleration of π/2 times the linear acceleration. The equation for the sinusoidal velocity profile may be the equation of the curve Y(t) illustrated in FIG. 6I. Any limit on the peak acceleration may be determined experimentally, based on the particular system. Given a required gap between articles to create, a max FPM may be calculated, and a profile that starts at zero (e.g., the end of the meter belt) can be calculated. For calculation purposes, the linear velocity profile may be used, as shown in FIG. 6I. An exemplary embodiment velocity profile 620 for accelerating an article and a velocity profile 621 for decelerating an article are shown in FIG. 6J. During acceleration of an article, in the first portion of the velocity profile 620 the gapping system may maintain a normal velocity, such as the velocity of the metering belt, for a time 1 to allow enough length of the item, such as the entire length of the item, to reach the conveyor unit. In time 2, the conveyor unit may accelerate to ramp up the velocity, in time 3 the velocity may be constant, and in time 4 the conveyor unit may decelerate to ramp the velocity down back to the normal velocity, for a time 5. During deceleration of an article, in the first portion of the velocity profile 621 the gapping system may maintain a normal velocity, such as the velocity of the metering belt, for a time 1 to allow enough length of the item, such as the entire length of the item, to reach the conveyor unit. In time 2, the conveyor unit may decelerate to ramp down the velocity, in time 3 the velocity may be constant at some minimum velocity, such as zero, 100 feet per minute, or any other minimum velocity, and in time 4 the conveyor unit may accelerate to ramp the velocity up back to the normal velocity, for a time 5. In this manner, the gaps may be increased or decreased by slowing down or speeding up articles. For example, as illustrated in FIG. 6K, the initial gap G may be increased by a distance K by slowing down carton 2 for a length of time, such that it takes K/normal velocity ($V_{NOM}$) more seconds for carton 2 to reach the end than cartons 1 or 3.

The maximum slowdown velocity is from nominal to zero, although a minimum velocity may be imposed to account for the physics of the drive. A certain linear velocity profile may be planned and a sinusoidal velocity profile of equivalent time may be implemented.

Figure 6L:
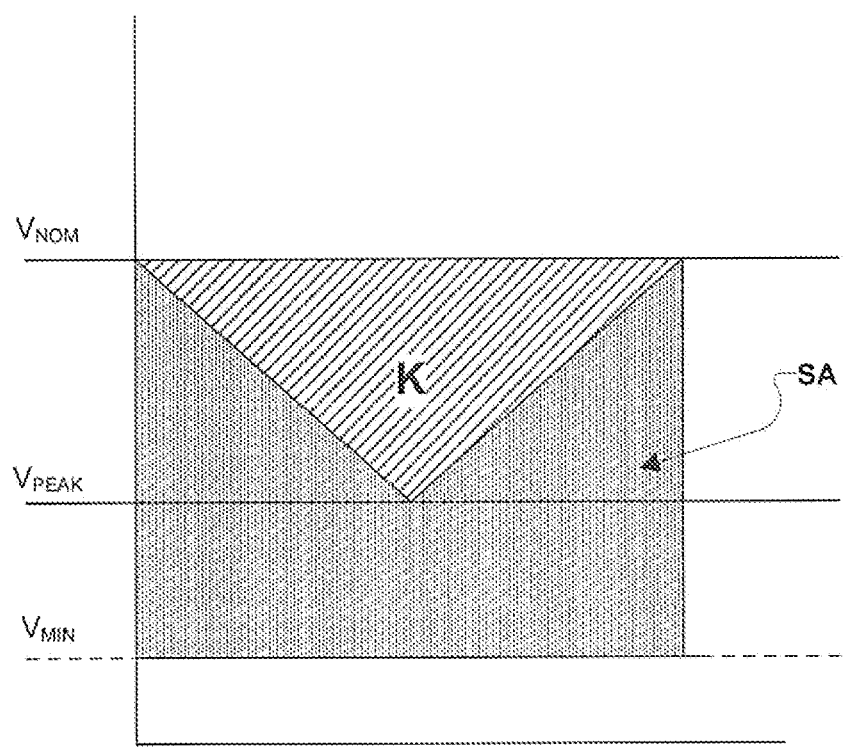

Another way to calculate the slowdown is that the stripe shaded area is "lost" distance and the lost distance must equal K, as shown in FIG. 6L. The shaded area "SA" shown in FIG. 6L may be based on the length of the conveyor units and may be defined by the equation:

$$SA = 2 * \frac{V_{NOM} + V_{MIN}}{2} * \frac{V_{NOM} - V_{MIN}}{a},$$

Where a is the acceleration, $V_{NOM}$ is the normal velocity, and $V_{MIN}$ is the minimum velocity.

In the various embodiments, the conveyor units may begin acceleration once a portion of the article to be controlled is on the belt, such as when the entire article is on the belt.

Figure 6M:
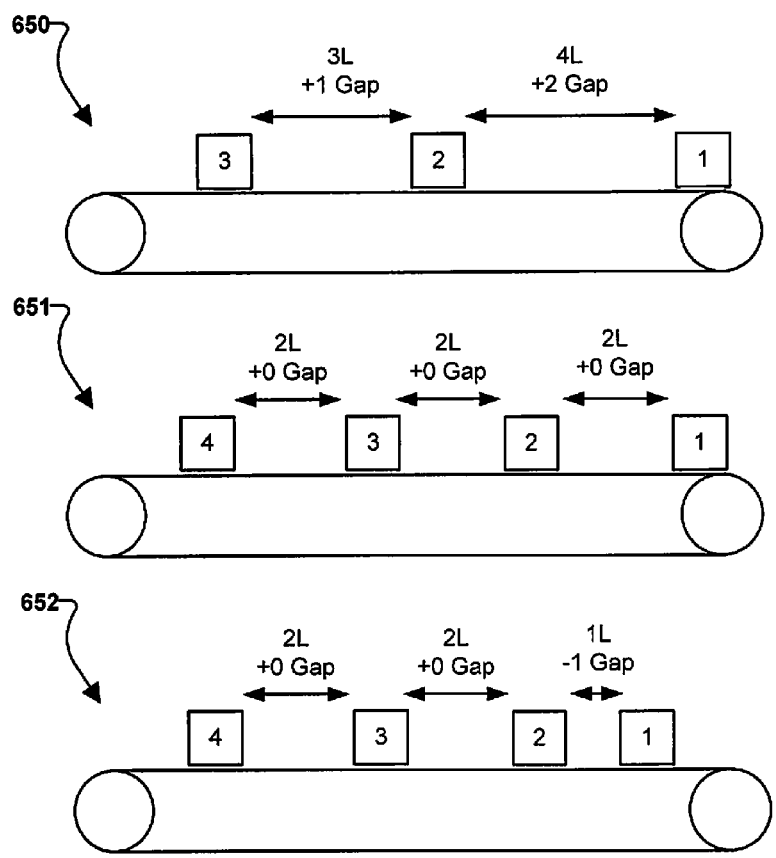

If the lead article has gap in front of the article (i.e., there is empty space downstream of the lead article), then the gapping system may determine whether to move the lead article ahead to create a gap bank (or gap excess), and if so, by how much. One solution is to place an arbitrary limit on the closing down of gaps and let the gapping system always shift articles forward. But this would include making an adjustment when no adjustment is needed. Since the gapping system may wait until the lead article is about to exit the meter belt before deciding what to do, in various embodiments the gapping system may determine what gaps are needed (if any) to meet a minimum gap bank (or gap excess requirement) and may move the lead article forward accordingly. Example gap bank scenarios 650, 651, and 652 are illustrated in FIG. 6M. In the example scenarios 650, 651, and 652, a desired gap of two carton lengths (2L) may be set for the gapping system and the gapping system may set a gap bank requirement at one carton length (+1 Gap). In scenario 650, the gap between carton 1 and carton 2 may be four carton lengths (4L) and the gap between carton 2 and carton 3 may be three carton lengths (3L). The excess gap may be +3 Gap, which may be higher than the gap bank requirement. Thus, the gapping system may not move carton 1 forward. In scenario 651, the gaps between the cartons 1, 2, 3, and 4 may all be two carton lengths (2L), and there may be no excess gap because cartons 1, 2, 3, and 4 are at the desired gap. Thus, the gapping system may move carton 1 forward 1 carton length (1L) to produce an excess gap of +1 Gap and meet the gap bank requirements. In scenario 652, carton 1 may be only 1 carton length (1L) from carton 2, and cartons 2, 3, and 4 may be properly gapped as desired. Thus, there may be negative excess gap (−1 Gap), and the gapping system may move carton 1 forward two carton lengths (2L) to create one excess gap (+1 Gap) to meet the gap bank requirement. In this manner, the gapping system may move the first carton forward as needed to always keep a certain amount in a "gap bank" which may provide room to move upstream cartons forward to adjust gaps as needed. Looking at upcoming gap requirements may require a longer meter belt.

Figure 6N:
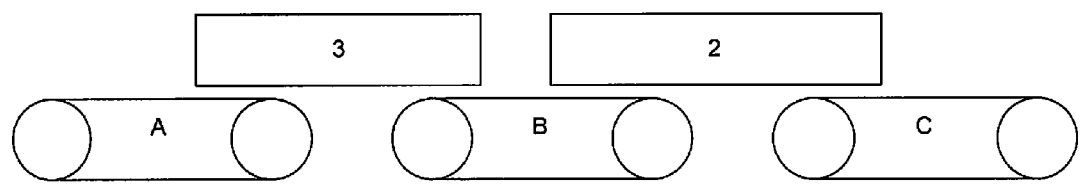

In embodiments, the conveying units (e.g., belts) may be shorter than the length of the articles. Thus, it may be possible for one conveying unit B to have parts of two cartons 3 and 2 on it as shown in FIG. 6N. There are various ways to determine which carton (i.e., which carton's profile) controls the speed of the conveying unit B. In various embodiments, the system may include rules for governing control of the conveying unit based on various factors. For example, carton 2 may control the speed because it is downstream. As another example, carton 3 may control the speed because it is shorter. As a further example, carton 2 may control the speed because it is longer. In embodiments, the profile of the article that is most affected by a given conveying unit may control the operation of the belt. The determination of the article most affected by a conveying unit may be determined based on the relative proportions in contact with the conveying unit and/or the gap between the articles. In an embodiment, the determination may be based on a comparison of the portion in contact with the conveying unit vs. a length of the article. The length of the gap between the articles may also be taken into account. For example, for each carton the following may be calculated: (level of contact+gap)/length of carton. Whichever carton has the large value may control the conveying unit.

In embodiments, the speed of an empty conveying unit (e.g., a belt) may be the last commanded speed of that conveying unit until something (i.e., an upcoming article) changes it. The speeds of downstream conveying units may be adjusted in advance of an upcoming article. In embodiments, empty conveying units may accelerate at a particular rate ($a_m$), for example a 2 g rate. So, the system may be configured to look ahead by a particular distance and adjust downstream conveying units. The system may look ahead by a distance (dist) that is no further than it takes to go from the current velocity ($V_c$) to zero. When the system determines a conveying unit is empty, the system may determine the speed of the next downstream conveying unit ($V_B$). If the speed on the downstream conveying unit ($V_B$) is less than the current velocity ($V_c$), the system may determine an adjusted velocity ($V_A$) for the empty conveying unit according to the equation:

$$V_A = V_C - a_m \frac{dist}{V_C}.$$

If the adjusted velocity ($V_A$) is greater than the speed of the downstream conveying unit ($V_B$), the empty conveying unit speed may be set to the adjusted velocity ($V_A$). If the adjusted velocity ($V_A$) is less than the speed of the downstream conveying unit ($V_B$), the empty conveying unit speed may be set to the speed on the downstream conveying unit ($V_B$). Alternatively, if the speed of the downstream conveying unit ($V_B$) is greater than the current velocity ($V_c$), the system may determine an adjusted velocity ($V_A$) for the empty conveying unit according to the equation:

$$V_A = V_C + a_m \frac{dist}{V_C}.$$

If the adjusted velocity ($V_A$) is less than the speed of the downstream conveying unit ($V_B$), the empty conveying unit speed may be set to the adjusted velocity ($V_A$). If the adjusted velocity ($V_A$) is greater than the speed on the downstream conveying unit ($V_B$), the empty conveying unit speed may be set to the speed of the downstream conveying unit ($V_B$).

To prevent a look ahead from affecting an existing article, the profile may need to be extended to include the exit of the full article length, and not just the nose. The preceding discussion may work for most conveying units (e.g., belts), but generally not for the first belt, because it needs to give up control of an article if the next article is coming. A check may be performed if an article owns the first belt with its tail portion to determine whether something is about to exit the meter belt.

FIG. 7 illustrates an exemplary processing architecture 700 of a material handling system 702 suitable for use with the various embodiments. The processing architecture 700 may be implemented in hardware, software, or combinations of hardware and software in one computing device or across a series of computing devices in communication with each other as needed to perform the functionality described herein.

The material handling system 702 may include a computing device 703 including a processor readable shared memory 704 connected to one or more processors 712. The one or more processors may function as controllers for the material handling system 702. For example, one processor may be a primary controller while another may serve as a backup controller that may be swapped for the primary controller automatically or by maintenance personnel in the event of a failure without undue service downtime. The shared memory 704 may include an operating system (e.g., Windows, Linux, etc.) and real time extension 710.

The one or more processors 712 may execute various logical layers, applications, or modules including a material handling controls 714, scans 726, user interface data access 734, middleware routing 736, device communications 740, operating system services 738, and input/output drivers 739. The various logical layers, applications, or modules including material handling controls 714, scans 726, user interface data access 734, middleware routing 736, device communications 740, operating system services 738, and/or input/output drivers 739 may be executed in conjunction with one another and exchange data with one another. As the one or more processors receive inputs (e.g., signals from switches, photo eyes, etc., data messages, or other various input types) the various logical layers, applications, or modules including material handling controls 714, scans 726, user interface data access 734, middleware routing 736, device communications 740, operating system services 738, and/or input/output drivers 739 may be executed individually and/or in concert by the one or more processors 712 to generate outputs (e.g., electrical signals to motor contacts, solenoid valves, switches, lamps, etc., data messages, or other output types).

Scans 726 may be repeatedly executed by the one or more processors 712 and may include a read inputs module 728, a solve logic module 730, and a write outputs module 732. By executing the various logical operations of the modules 728, 730, and 732 on a regular period basis the scans 726 may be counted to measure time. The solve logic module 730 may incorporate any type of logic, including "if-then-else" branching logic, motion control logic, simple logic, sophisticated logic, hard lined logic, configured logic, etc. Data used by the solve logic module 730 may reside in the shared memory 704, such as data 706, or a local, remote, or cloud-based data storage device, such as data store 754. Scans 726 may be performed at different intervals, for example scans for motion control may occur every 1 millisecond to 2 milliseconds, scans for merge subsystems may occur every 5 milliseconds, and general conveyor scans may occur every 25 milliseconds.

Material handling controls 714 may include order fulfillment module 716, conveyor or other material handling equipment control module 718 including a machine control module 720 to generate instructions for conveyors and/or other material handling equipment, order manager module 722, and merge mode application or module 724 to monitor conditions and adjust merge modes for conveyors within a material handling system (e.g., a distribution center).

The one or more processor 712 may exchange data with scanners 742, sensors 744, actuators 748, diagnostic systems 750, material handling equipment controls 746 (such as conveyor controls), data store 754, and other devices 752 (e.g., scales, printers, etc.) via network connections 756 (e.g., TCP/IP connections, Ethernet connections, Ethercat connections, PROFIBUS connections, RS 232 connections, USB connections, Wi-Fi connections, cellular connections, etc.).

The processing architecture 700 may include other systems interfacing with the material handling system 702 via network connections 774 (e.g., TCP/IP connections, Ethernet connections, Ethercat connections, PROFIBUS connections, RS 232 connections, USB connections, Wi-Fi connections, cellular connections, etc.), such as user interface devices 758 (e.g., a display, user terminal, etc.) displaying a local application 760 or web application 762, host communication devices 764 enabling communication with a host device 767 (e.g., via FTP, TCP/IP, etc.), a database 770, a warehouse control system (WCS) 770, and/or a warehouse management system (WMS) 772. A host device may also include a merge mode module or application 768 which may transmit information related to the merging operations of containers to the one or more processors 712 of the material handling system 702.

Figure 8:
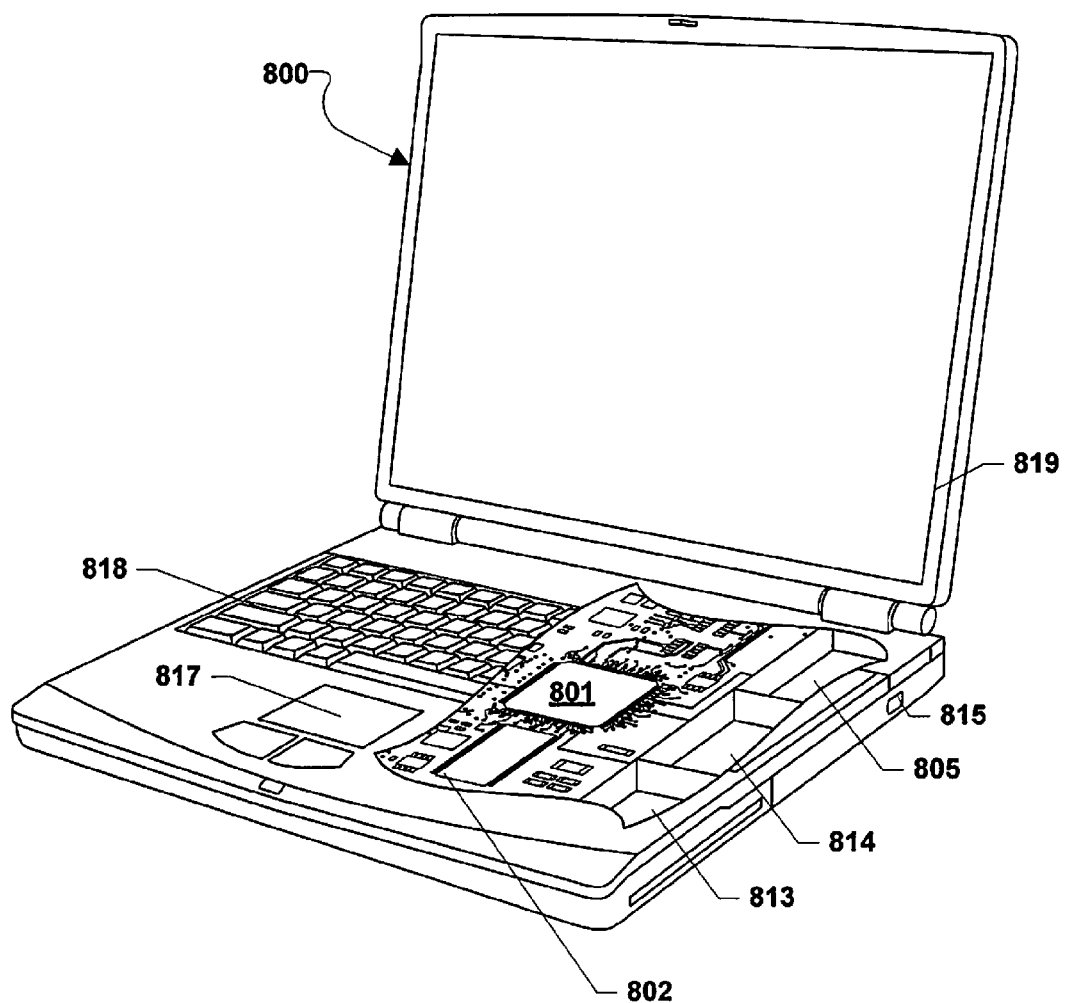
FIG. 8 is a component block diagram of an example laptop computing device suitable for use with the various embodiments.

The various embodiments may be implemented in any of a variety of computing devices, an example of which is illustrated in FIG. 8. A computing device 800 will typically include a processor 801 coupled to volatile memory 802 and a large capacity nonvolatile memory, such as a disk drive 805 of Flash memory. The computing device 800 may also include a floppy disc drive 813 and a compact disc (CD) drive 814 coupled to the processor 801. The computing device 800 may also include a number of connector ports 815 coupled to the processor 801 for establishing data connections or receiving external memory devices, such as a USB or FireWire® connector sockets, or other network connection circuits for establishing network interface connections from the processor 801 to a network or bus, such as a local area network coupled to other computers and servers, the Internet, the public switched telephone network, and/or a cellular data network. The computing device 800 may also include the trackball or touch pad 817, keyboard 818, and display 819 all coupled to the processor 801.

Figure 9:
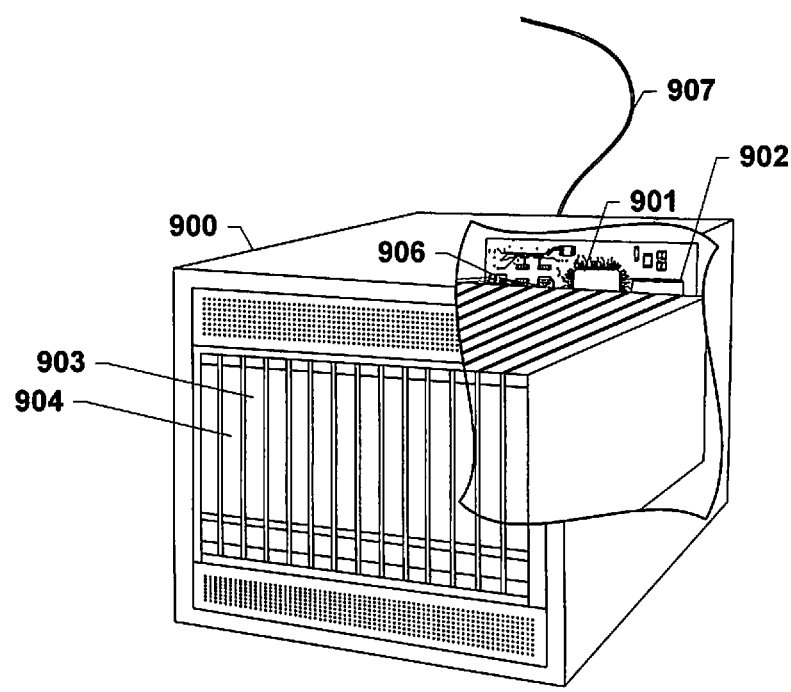
FIG. 9 is a component block diagram of a server computing device suitable for use in an embodiment.

The various embodiments may also be implemented on any of a variety of commercially available server devices, such as the server 900 illustrated in FIG. 9. Such a server 900 typically includes a processor 901 coupled to volatile memory 902 and a large capacity nonvolatile memory, such as a disk drive 903. The server 900 may also include a floppy disc drive, compact disc (CD) or DVD disc drive 904 coupled to the processor 901. The server 900 may also include network access ports 906 coupled to the processor 901 for establishing network interface connections with a network 907, such as a local area network coupled to other computers and servers, the Internet, the public switched telephone network, and/or a cellular data network.

The processors 801 and 901 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 802, 805, 902, and 903 before they are accessed and loaded into the processors 801 and 901. The processors 801 and 901 may include internal memory sufficient to store the application software instructions. In many devices the internal memory may be a volatile or nonvolatile memory, such as flash memory, or a mixture of both. For the purposes of this description, a general reference to memory refers to memory accessible by the processors 801 and 901 including internal memory or removable memory plugged into the device and memory within the processor 801 and 901 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module (or processor-executable instructions) which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A material handling system, comprising:
a plurality of independently controllable conveying units; and
a processor connected to the plurality of conveying units, wherein the processor is configured with processor-executable instructions to perform operations comprising:
generating motion profiles for a plurality of articles based on at least one known first gap between the articles as the articles enter the material handling system to provide a pre-determined gap between the articles that is different than the first gap;
calculating a position of a selected article on a selected one of the conveying units based upon the associated motion profile; and
controlling the plurality of conveying units at a respective time based upon the calculated position to move each article in accordance with its motion profile as the plurality of articles move through the material handling system, wherein:
each conveying unit is controlled so as to (i) move a first article located on the conveying unit with at least one of a first velocity and a first acceleration that is based on the motion profile associated with the first article, and (ii) to move a second article located on the conveying unit subsequent to the first article with at least one of a second velocity and a second acceleration that is based on the motion profile associated with the second article,
the plurality of conveying units are controlled such that the plurality of articles have the pre-determined gap between the articles when the articles exit the plurality of conveying units,
the plurality of conveying units are controlled to concurrently implement the plurality of motion profiles for each of the plurality of articles by adding an amount of correction provided by an overlap in the respective motion profiles associated with a selected article and an adjacent downstream article, and
the plurality of conveying units are controlled by (i) determining based on the respective motion profiles that an upstream article and an adjacent downstream article will both have a least a portion of their respective length on a selected conveying unit, and (ii) determining which of the upstream and downstream articles have a larger relative proportion of contact area with the selected conveying unit; and (iii) selecting one of the respective motion profiles for controlling the selected conveying unit based upon the determined larger relative portion of contact area.

2. A material handling system, comprising:
a plurality of independently controllable conveying units; and
a processor connected to the plurality of conveying units, wherein the processor is configured with processor-executable instructions to perform operations comprising:
generating motion profiles for a plurality of articles based on at least one known first gap between the articles as the articles enter the material handling system to provide a pre-determined gap between the articles that is different than the first gap;
calculating a position of a selected article on a selected one of the conveying units based upon the associated motion profile; and
controlling the plurality of conveying units at a respective time based upon the calculated position to move each article in accordance with its motion profile as the plurality of articles move through the material handling system, wherein:
each conveying unit is controlled so as to (i) move a first article located on the conveying unit with at least one of a first velocity and a first acceleration that is based on the motion profile associated with the first article, and (ii) to move a second article located on the conveying unit subsequent to the first article with at least one of a second velocity and a second acceleration that is based on the motion profile associated with the second article,
the plurality of conveying units are controlled such that the plurality of articles have the pre-determined gap between the articles when the articles exit the plurality of conveying units, and
each conveying unit controlled by (i) determining that a selected conveying unit is empty; (ii) in response to determining that the selected conveying unit is empty, determining an adjusted velocity of an adjacent upstream conveying unit according to a motion profile associated with an upstream article when positioned to transition onto the selected conveying unit; and (iii) adjusting a velocity of the selected conveying unit to reach the adjusted velocity prior to the upstream article transitioning onto the selected conveying unit.

3. A method for operating a material handling system including a plurality of independently controllable conveying units, the method comprising:
generating, by a computing device, motion profiles for a plurality of articles based on at least one known first gap between the articles as the articles enter the material handling system to provide a pre-determined gap between the articles that is different than the first gap;
calculating a position of a selected article on a selected one of the conveying units based upon the associated motion profile; and
controlling, by the computing device, the plurality of conveying units at a respective time based upon the calculated position to move each article in accordance with its motion profile as the plurality of articles move through the material handling system, wherein:
each conveying unit is controlled so as to (i) move a first article located on the conveying unit with at least one of a first velocity and a first acceleration that is based on the motion profile associated with the first article, and (ii) to move a second article located on the conveying unit subsequent to the first article with at least one of a second velocity and a second acceleration that is based on the motion profile associated with the second article, the plurality of conveying units are controlled such that the plurality of articles have the pre-determined gap between the articles when the articles exit the plurality of conveying units, the plurality of conveying units are controlled to concurrently implement the plurality of motion profiles for each of the plurality of articles by adding an amount of correction provided by an overlap in the respective motion profiles associated with a selected article and an adjacent downstream article, and the plurality of conveying units are controlled by (i) determining based on the respective motion profiles that an upstream article and an adjacent downstream article will both have a least a portion of their respective length on a selected conveying unit, and (ii) determining which of the upstream and downstream articles have a larger relative proportion of contact area with the selected conveying unit; and (iii) selecting one of the respective motion profiles for controlling the selected conveying unit based upon the determined larger relative portion of contact area.

4. The method of claim 3, further comprising:
determining that the first gap of a selected article and a downstream article is in excess of a threshold value for a pre-determined gap; and
generating a motion profile for the selected article that accelerates the selected article toward the downstream article to create a gap bank usable for an upstream article to create a wider gap with the selected article.

5. The method of claim 3, wherein the motion profile comprises a triangular velocity profile.

6. The method of claim 3, wherein the motion profile comprises a curved, sinusoidal velocity profile.

7. The method of claim 3, wherein the conveying units comprise at least one of a roller, a short belt conveyor, and a short strip belt conveyor.

8. The method of claim 7, wherein the articles comprise cartons.

9. A method for operating a material handling system including a plurality of independently controllable conveying units, the method comprising:
generating, by a computing device, motion profiles for a plurality of articles based on at least one known first gap between the articles as the articles enter the material handling system to provide a pre-determined gap between the articles that is different than the first gap;
calculating a position of a selected article on a selected one of the conveying units based upon the associated motion profile; and
controlling, by the computing device, the plurality of conveying units at a respective time based upon the calculated position to move each article in accordance with its motion profile as the plurality of articles move through the material handling system, wherein:
each conveying unit is controlled so as to (i) move a first article located on the conveying unit with at least one of a first velocity and a first acceleration that is based on the motion profile associated with the first article, and (ii) to move a second article located on the conveying unit subsequent to the first article with at least one of a second velocity and a second acceleration that is based on the motion profile associated with the second article, the plurality of conveying units are controlled such that the plurality of articles have the pre-determined gap between the articles when the articles exit the plurality of conveying units, and the plurality of conveying units are controlled by (i) determining that a selected conveying unit is empty; (ii) in response to determining that the selected conveying unit is empty, determining an adjusted velocity of an adjacent upstream conveying unit according to a motion profile associated with an upstream article when positioned to transition onto the selected conveying unit; and (iii) adjusting a velocity of the selected conveying unit to reach the adjusted velocity prior to the upstream article transitioning onto the selected conveying unit.

10. A computing device, comprising:
a processor configured with processor-executable instructions to perform operations comprising:
generating motion profiles for a plurality of articles to provide a pre-determined gap between the articles based on at least one known first gap between the articles as the articles enter a material handling system;
calculating a position of a selected article on a selected one of the conveying units based upon the associated motion profile; and
controlling a plurality of independently controllable conveying units of a material handling system at a respective time based upon the calculated position to move each article in accordance with its motion profile as the plurality of articles move through the material handling system, wherein:
each conveying unit is controlled so as to (i) move a first article located on the conveying unit with at least one of a first velocity and a first acceleration that is based on the motion profile associated with the first article, and (ii) to move a second article located on the conveying unit subsequent to the first article with at least one of a second velocity and a second acceleration that is based on the motion profile associated with the second article, the plurality of conveying units are controlled such that the plurality of articles have the pre-determined gap between the articles when the articles exit the plurality of conveying units, the plurality of conveying units are controlled to concurrently implement the plurality of motion profiles for each of the plurality of articles by adding an amount of correction provided by an overlap in the respective motion profiles associated with a selected article and an adjacent downstream article, and the plurality of conveying units are controlled by (i) determining based the respective motion profiles that an upstream article and an adjacent downstream article will both have a least a portion of their respective length on a selected conveying unit, and (ii) determining which of the upstream and downstream articles have a larger relative proportion of contact area with the selected conveying units; and (iii) selecting one of the respective motion profiles for controlling the selected conveying unit based upon the determined larger relative portion of contact area.

11. The computing device of claim 10, wherein the processor is configured with processor-executable instructions to perform operations such that the plurality of conveying units are controlled to concurrently implement the plurality of motion profiles for each of the plurality of articles by adding an amount of correction provided by an overlap in the respective motion profiles associated with a selected article and an adjacent downstream article.

12. The computing device of claim 10, wherein the conveying units comprise at least one of a roller, a short belt conveyor, and a short strip belt conveyor.

13. The computing device of claim 12, wherein the articles comprise cartons.

14. A computing device, comprising:
a processor configured with processor-executable instructions to perform operations comprising:
generating motion profiles for a plurality of articles to provide a pre-determined gap between the articles based on at least one known first gap between the articles as the articles enter a material handling system;
calculating a position of a selected article on a selected one of the conveying units based upon the associated motion profile; and
controlling a plurality of independently controllable conveying units of a material handling system at a respective time based upon the calculated position to move each article in accordance with its motion profile as the plurality of articles move through the material handling system, wherein:
each conveying unit is controlled so as to (i) move a first article located on the conveying unit with at least one of a first velocity and a first acceleration that is based on the motion profile associated with the first article, and (ii) to move a second article located on the conveying unit subsequent to the first article with at least one of a second velocity and a second acceleration that is based on the motion profile associated with the second article,
the plurality of conveying units are controlled such that the plurality of articles have the pre-determined gap between the articles when the articles exit the plurality of conveying units, and
each conveying unit controlled by (i) determining that a selected conveying unit is empty; (ii) in response to determining that the selected conveying unit is empty, determining an adjusted velocity of an adjacent upstream conveying unit according to a motion profile associated with an upstream article when positioned to transition onto the selected conveying unit; and (iii) adjusting a velocity of the selected conveying unit to reach the adjusted velocity prior to the upstream article transitioning onto the selected conveying unit.

* * * * *